No. 780,207. PATENTED JAN. 17, 1905.
W. J. LITTLE.
PREPARED PLATE FOR MAKING GRAPHIC NEGATIVES.
APPLICATION FILED OCT. 17, 1904.

WITNESSES.

INVENTOR.

No. 780,207.

Patented January 17, 1905.

UNITED STATES PATENT OFFICE.

WILLIAM JAY LITTLE, OF NEWTON, MASSACHUSETTS.

PREPARED PLATE FOR MAKING GRAPHIC NEGATIVES.

SPECIFICATION forming part of Letters Patent No. 780,207, dated January 17, 1905.

Application filed October 17, 1904. Serial No. 228,720.

*To all whom it may concern:*

Be it known that I, WILLIAM JAY LITTLE, a citizen of the United States, and a resident of Newton, in the county of Middlesex and State of Massachusetts, have invented a new and useful Improvement in Prepared Plates for Making Graphic Negatives, of which the following is a full, clear, and exact description, reference being had to the accompanying drawings, forming a part of this specification, in explaining its nature.

My invention relates to an improvement in prepared plates, and is of a kind especially adapted to be used in connection with my improved negative plate for photographic printing and the process for making the same described in my application for Letters Patent of the United States, Serial No. 199,034, filed March 19, 1904. As referred to in said application the basic element of said negative plate and process of making the same consists in the use of a transparent or at least translucent plate having an etching surface or ground made of some wax or wax-like composition which is also transparent or translucent, so that by placing the plate directly over or in front of the subject from which the etching is to be taken and looking through the plate the lines of the subject may be cut or etched into its etching-ground. In case a positive is to be taken directly from the negative plate, as described in said application, its etching surface or ground is first colored or coated with some non-actinic substance or color which is also transparent, or at least translucent, in order that the etching may be made by looking through the plate, as before explained. It is therefore the prepared plate as a separate article of manufacture which forms the subject-matter of this application. The prepared plate can best be seen and understood by reference to the drawings, in which—

Figure 1:
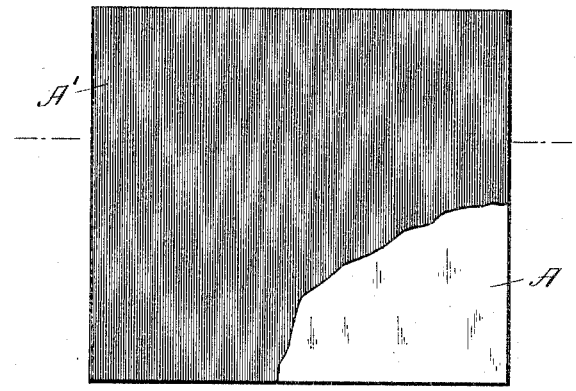
Figure 2:

Figure 1 shows it in plan. Fig. 2 shows the same in cross vertical section.

Referring to the drawings, A represents the plate or rather the body or base thereof. This is preferably made of glass, but of course may be any film, paper, or other material in the nature of a plate which is transparent or at least so translucent that the lines of the subject over or in front of which it is placed may be distinctly seen.

A' represents the coating of the plate or etching-ground. This may be of any wax or wax-like composition and like the plate is transparent or at least translucent. It is laid evenly upon the base A and so thinly that in scratching or cutting through the etching surface or ground the etched lines may be of uniform depth.

When a positive is to be taken directly from the negative plate, as described in my said application, then the etching surface or ground in the prepared plate is first made or coated with some very non-actinic substance or color which also is transparent or translucent that the drawing or etching may still be made by looking through the plate upon the subject, as before explained. In such case of course the etching surface or ground is made or coated with a color or matter having such degree of non-actinism as depends upon the shade effects desired to be obtained, the main non-actinic surface of the negative plate corresponding with the background of the print. Inasmuch as some backgrounds are light, while in others better effects are obtained from darker degrees of shading, it is obvious, of course, that the non-actinic coating or surfacing of the plate may vary in its degree of actinism or non-actinism. I would also be understood in using the terms "actinic" or "non-actinic" as meaning by "actinic" an instrumentality or substance more potent to let light through it to effect chemical changes and by "non-actinic" an instrumentality or substance less potent to let light through it to effect chemical changes.

Having thus fully described my invention, I claim and desire to secure by Letters Patent of the United States—

1. A prepared plate having an etching surface or ground on which an etching may be made from a subject sighted through said plate.

2. A prepared plate having a transparent or translucent base and a transparent or translucent etching surface or ground, coating said base, on which an etching may be made from a subject sighted through said base.

3. A prepared plate, the base of which is of some hard, transparent or translucent substance, and a transparent or translucent etching surface or ground thinly and evenly deposited upon said base.

4. A prepared plate having a transparent or translucent non-actinic etching surface or ground.

5. A prepared plate having an actinic, transparent or translucent base, and a non-actinic, transparent or translucent etching surface or ground.

WILLIAM JAY LITTLE.

Witnesses:
JOHN E. R. HAYES,
MARTIN V. FOLEY.